(12) United States Patent
Hayashi (10) Patent No.: US 6,172,311 B1
(45) Date of Patent: Jan. 9, 2001

(54) LEVER SWITCH

(75) Inventor: Hirofumi Hayashi, Aichi (JP)

(73) Assignee: Kabushiki Kaisha Tokai Rika Denki Seisakusho, Aichi (JP)

( * ) Notice: Under 35 U.S.C. 154(b), the term of this patent shall be extended for 0 days.

(21) Appl. No.: 09/461,340

(22) Filed: Dec. 15, 1999

(30) Foreign Application Priority Data

Jan. 19, 1999 (JP) .................................................. 11-010533

(51) Int. Cl.7 .................................................... H01H 3/16
(52) U.S. Cl. .................................... 200/61.27; 200/61.54; 200/61.28
(58) Field of Search ............................ 200/61.27, 61.28, 200/61.54, 5 R, 295, 335

(56) References Cited

U.S. PATENT DOCUMENTS

| 5,708,242 | * | 1/1998 | Uchiyama | 200/61.54 |
| 5,739,751 | * | 4/1998 | Ishihara et al. | 340/475 |
| 5,859,396 | * | 1/1999 | Yokoyama | 200/61.54 |
| 5,895,899 | * | 4/1999 | Sano | 200/61.54 |
| 5,900,601 | * | 5/1999 | Uchiyama | 200/61.27 |

\* cited by examiner

Primary Examiner—Michael L. Gellner
Assistant Examiner—Nhung Nguyen
(74) Attorney, Agent, or Firm—Morgan, Lewis & Bockius LLP (57) ABSTRACT

In a lever switch assembly, a sliding portion is formed on a bracket at an area located inside a first unit case. The sliding portion is constructed so as to slide along a face inside the first unit case which is directed facing away from a second unit case. With this arrangement, a projection conventionally provided at a tip end of the bracket has become unnecessary, and an overall thickness of the assembly can be decreased. During assembly, the sliding portion is blocked by the face inside the first unit case which is directed facing away from the second unit case and therefore, the bracket will be prevented from being disengaged at a stage before the second unit case is assembled.

2 Claims, 8 Drawing Sheets

LEVER SWITCH

BACKGROUND OF INVENTION

1. Field of Invention

This invention relates to a lever switch assembly which integrally includes both angle adjusting mechanisms for respectively imparting angular adjustments to rotations of an operating lever in a first direction and a second direction.

2. Related Art

Figure 6:
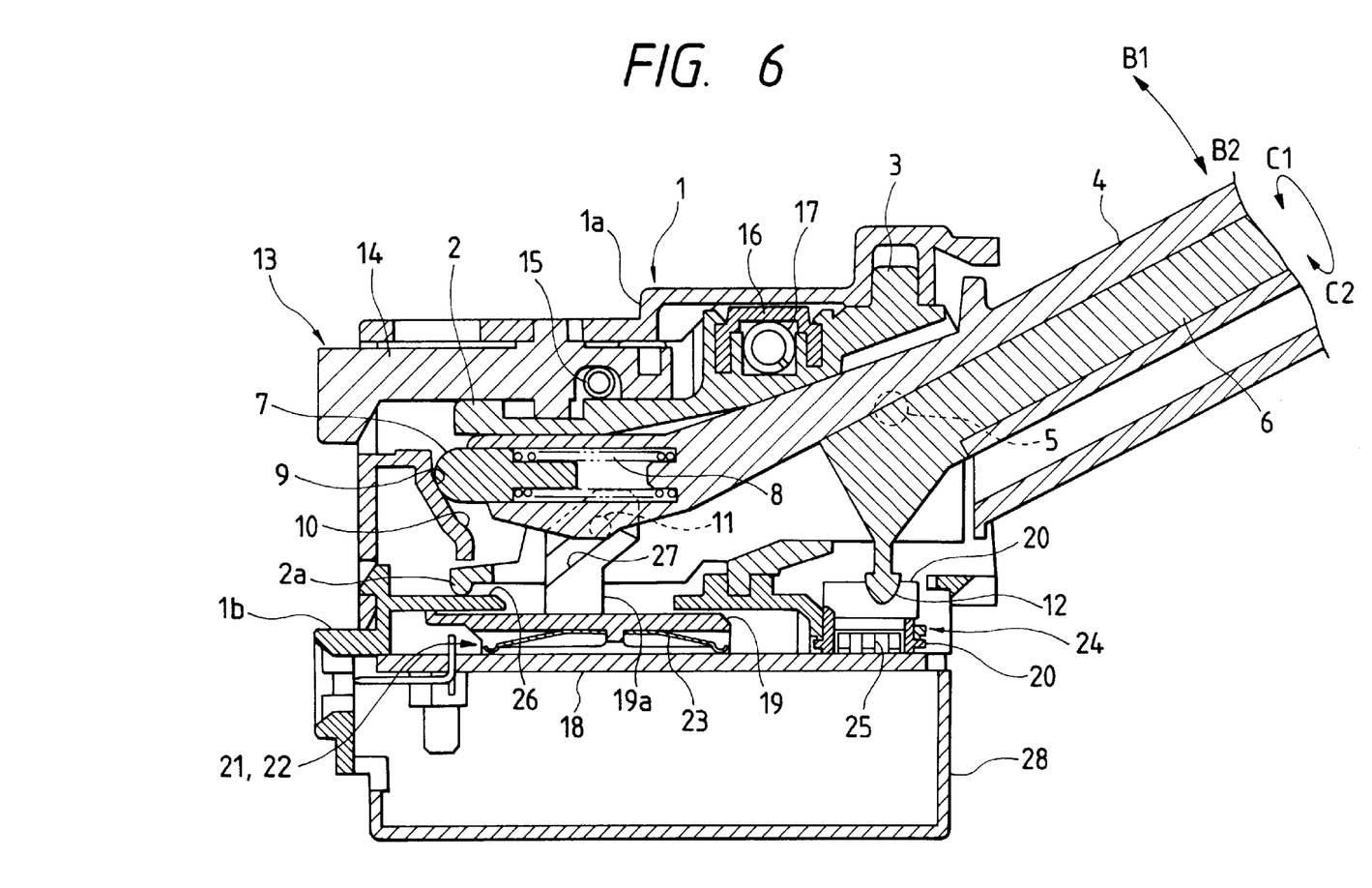
FIG. 6 is a view corresponding to FIG. 1 showing a conventional structure.
Figure 7:
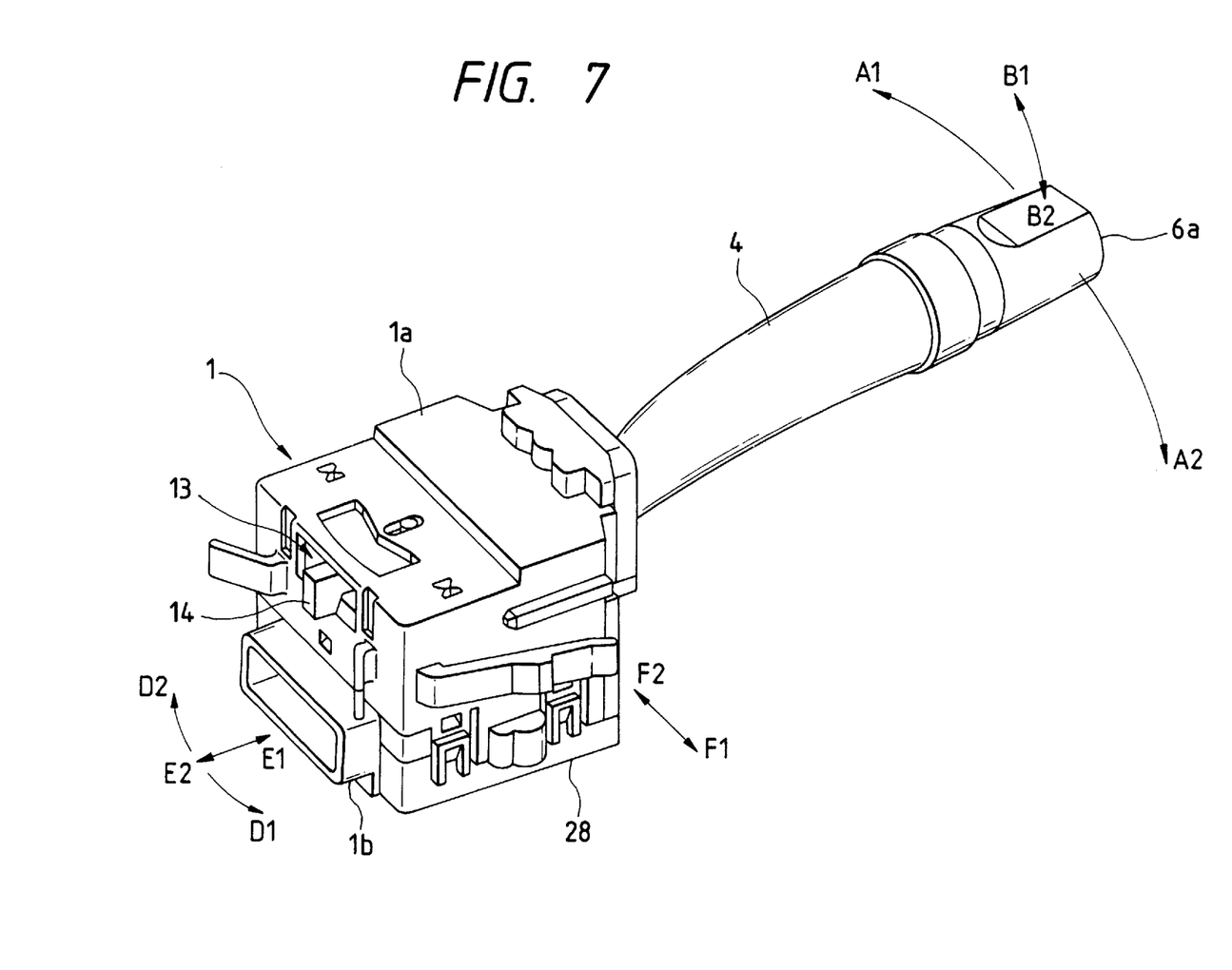
FIG. 7 is a view of the same corresponding to FIG. 2.

Heretofore, as a lever switch assembly for vehicles, for example, there has been provided an assembly so constructed as shown in FIGS. 6 and 7.

In the conventional structure, a case 1 includes a first unit case 1a positioned in the upper part of the drawings and a second unit case 1b positioned in the lower part of the drawings and connected to the first unit case 1a. The first unit case 1a is provided with a bracket 2 so as to rotate around a first pivotal shaft 3 in a direction perpendicular to a vertical direction in the drawings where the unit cases 1a and 1b are fastened together (in a direction as shown by arrows A1, A2 in FIG. 7).

The bracket 2 is provided with a hollow operating lever 4 so as to rotate around a second pivotal shaft 5 in a direction where the unit cases 1a, 1b are fastened (in a direction as shown by arrows B1, B2 respectively in FIGS. 6 and 7). This operating lever 4 is so adapted as to rotate also in the direction as shown by the arrows A1, A2 together with the bracket 2.

An operating shaft 6 is inserted into the operating lever 4 rotatably around its own axis (in a direction as shown by arrows C1, C2 in FIG. 6). The operating shaft 6 is so adapted as to be rotatably operated by means of an operating button 6a (Refer to FIG. 7) fitted to its tip end at an opposite side to the case 1 (remote from the case 1).

At one end of the operating lever 4 located inside the first unit case 1a is provided an angle adjusting piece 7 which is outwardly forced by a spring 8. A first angle adjusting face 9 and a second angle adjusting face 10 are formed inside the first unit case 1a so as to mate with the angle adjusting piece 7. The first angle adjusting face 9 is so adapted as to contact the angle adjusting piece 7 when the operating lever 4 is rotated in the direction of the arrows A1, A2 to give an angular adjustment to the rotation of the operating lever 4 in the direction of the arrows A1, A2, and is corrugated having concave portions and convex portions in the direction of the arrows A1, A2 (in a direction perpendicular to a paper face in FIG. 6).

The second adjusting face 10 is so adapted as to contact the angle adjusting piece 7 when the operating lever 4 is rotated in the direction of the arrows B1, B2 to give an angular adjustment to the rotation of the operating lever 4 in the direction of the arrows B1, B2, and is corrugated having concave portions and convex portions in the direction of the arrows B1, B2 (in a vertical direction in FIG. 6).

The operating lever 4 is further provided with rocking projections 11 which project from both sides at its one end located inside the first unit case 1a. The operating shaft 6 is provided with a rocking projection 12 which projects downwardly at its one end located inside the first unit case 1a.

On an upper face of the bracket 2 in FIG. 6 are arranged various components which compose a lever canceling mechanism 13. This lever canceling mechanism 13 is so adapted as to restore the operating lever 4 which has been rotated in the direction of the arrows A1, A2 and held by the first angle adjusting face 9, by means of a rotary restoring operation of a steering wheel which is not shown. The lever canceling mechanism 13 includes the various components, such as a ratchet 14, a spring 15 for urging the ratchet 14 toward the steering wheel, a back plate 16 with which the ratchet 14 engages at the restoration, a spring 17 for resiliently holding the back plate 16, etc.

On the other hand, the second unit case 1b is provided with a wiring board 18 at its back face. Between the wiring board 18 and the second unit case 1b are provided a first contact holder 19 and a second contact holder 20 in a slidable manner. The first contact holder 19 is movable in the same direction (in a direction as shown by arrows D1, D2 in FIG. 7) as the rotation direction A1, A2 of the operating lever 4 and also movable in a direction perpendicular (in a direction as shown by arrows E1, E2 in FIG. 7) to the direction A1, A2. The second contact holder 20 is movable in a direction perpendicular (in a direction as shown by arrows F1, F2 in FIG. 7) to the moving direction E1, E2 of the first contact holder 19.

Moreover, the first contact holder 19 and the wiring board 18 constitute a first switch 21 and a second switch 22 therebetween. On the back face of the first contact holder 19 is attached a movable contact 23 which is common for both the first and second switches 21, 22. On the wiring board 18 are provided a fixed contact (not shown) for the first switch 21 which the movable contact 23 is engaged with and disengaged from along with the movement of the contact holder 19 in the direction of the arrows D1, D2, and a fixed contact (also not shown) for the second switch 22 which the movable contact 23 is engaged with and disengaged from along with the movement of the contact holder 19 in the direction of the arrows E1, E2.

The second contact holder 20 and the wiring board 18 constitute a third switch 24 therebetween. On the back face of the second contact holder 20 is attached a movable contact 25 for the third switch 24. On the wiring board 18 are provided a fixed contact (also not shown) for the third switch 24 which the movable contact 25 is engaged with and disengaged from along with the movement of the contact holder 20 in the direction of the arrows F1, F2.

In this state, the second unit case 1b is fastened to the first unit case 1a. On this occasion, a face 26 of the second unit case 1b adjacent to the first unit case 1a (an upper face in FIG. 6) is made contact with a projection 2a which is formed at a tip end of the bracket 2 located in the first unit case 1a thereby to press and hold the bracket 2.

The first contact holder 19 has a pair of arm portions 19a (only one is shown) which project out of the second unit case 1b (into the first unit case 1a). Between the arm portions 19a is positioned the end of the operating lever 4 located inside the first unit case 1a, while the rocking projections 11 are slidably inserted into diagonal grooves 27 which are formed at respective inner faces of the arm portions 19a.

The second contact holder 20 also has a pair of arm portions 20a (only one is shown) which project out of the second unit case 1b (into the first unit case 1a). Between the arm portions 20a is positioned a rocking projection 12 of the operating shaft 6 in a slidable manner. The back face of the wiring board 18 is protected with a cover 28.

With the above described arrangement, when the operating lever 4 is rotated in the direction of the arrows A1, A2, one end of the operating lever 4 located inside the first unit case 1a presses the arm portions 19a of the first contact holder 19 in the direction of the arrows D1, D2, thereby to move the first contact holder 19 in the direction of the arrows D1, D2 together with the movable contact 23. Then, the first switch 21 responds to give a turn signal, for example.

On this occasion, the projection 2a at the tip end of the bracket 2 located in the first unit case 1a slides along the face 26 of the second unit case 1b adjacent to the first unit case 1a. Rotary positions of the operating lever 4 rotated in the directions of the arrows A1 and A2, and the neutral position are maintained by the first angle adjusting face 9 in engagement with the angle adjusting piece 7.

When the operating lever 4 is rotated in the direction of the arrows B1, B2, the rocking projections 11 are caused to engage with the grooves 27 to press the first contact holder 19 in the direction of the arrows E1, E2 thereby to move the first contact holder 19 in the direction of the arrows E1, E2 together with the movable contact 23. Then, the second switch 22 responds to conduct a dimmer control, for example. The operating lever 4 is so constructed as to be automatically returned to the initial position when the rotary operation in the direction of the arrow B1 is released. The initial position is maintained by the second angle adjusting face 10 in engagement with the angle adjusting piece 7.

When the operating shaft 6 is rotated in the direction of the arrows C1, C2, the rocking projection 12 presses the arm portions 20a of the second contact holder 20 in the direction of the arrows F1, F2 thereby to move the second contact holder 20 in the direction of the arrows F1, F2 together with the movable contact 23. Then, the third switch 24 responds to conduct a light control, for example. The operating shaft 6 takes three rotary positions in the direction of the arrows C1, C2, namely an off position, a small lamp lighting position, and a head lamp lighting position. These three positions are maintained by an angle adjusting mechanism which is not shown.

In the above described conventional arrangement, both the first angle adjusting face 9 for imparting the angular adjustment to the rotation of the operating lever 4 in the direction of the arrows A1, A2 and the second angle adjusting face 10 for imparting the angular adjustment to the rotation of the operating lever 4 in the directions of the arrows B1, B2 are provided together in the first unit case 1a. In short, both the angle adjusting faces 9, 10 for imparting the angular adjustments to the rotations of the operating lever 4 respectively in the directions of the arrows A1, A2 and the arrows B1, B2 with which the angle adjusting piece 7 commonly engages are integrally formed.

Therefore, it is advantageous with this arrangement that the number of the components to be used can be decreased and the number of assembling steps can be also reduced. However, because the second angle adjusting face 10 is located closer to the second unit case 1b than the first angle adjusting face 9, an overall thickness in this direction tends to be larger. In addition, the various components of the lever canceling mechanism 13 are arranged on the bracket 2 at a side remote from the second unit case 1b, which makes the total thickness much larger.

Figure 8:
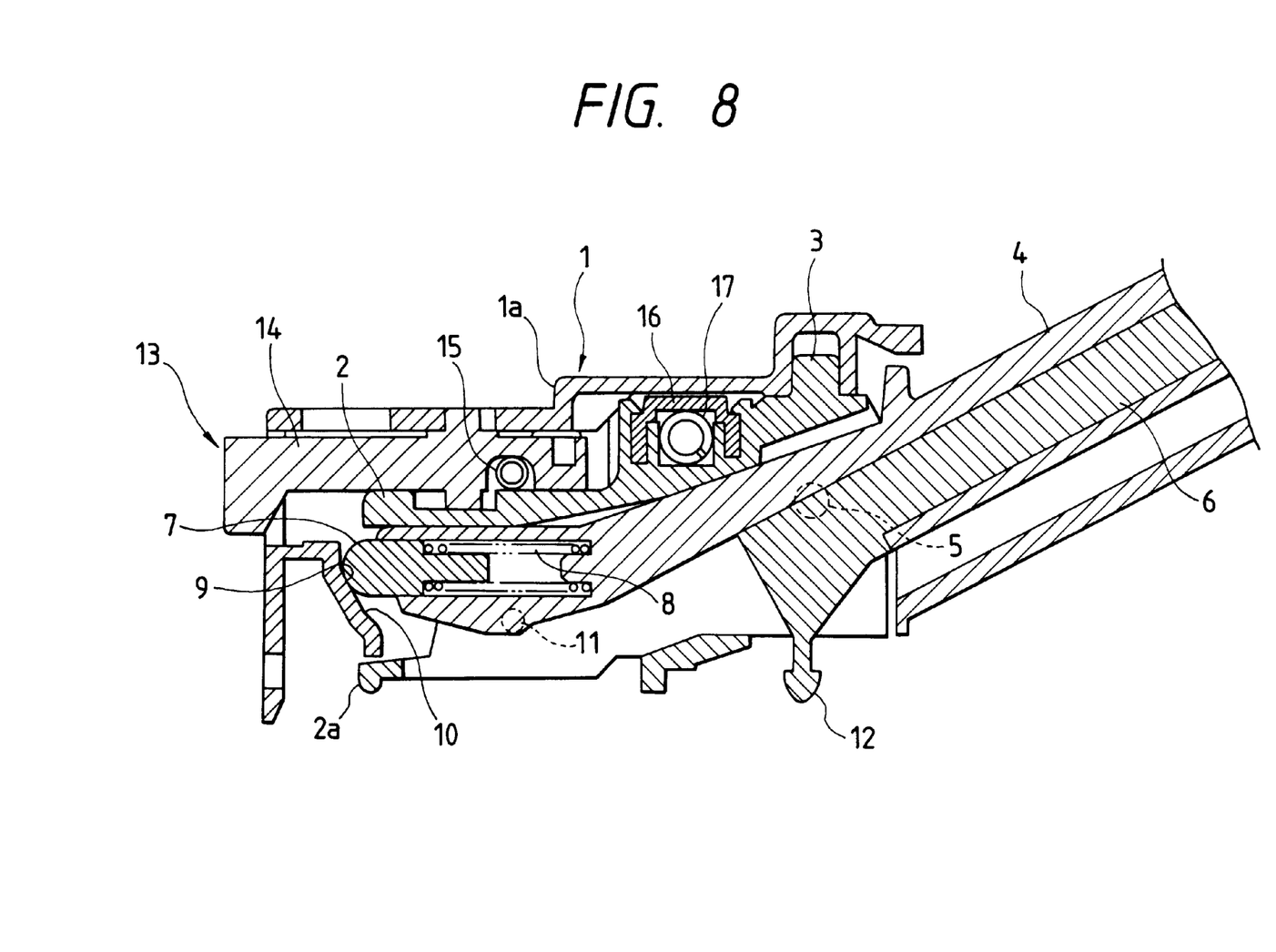
FIG. 8 is a sectional view of the same while being assembled.
Figure 9:
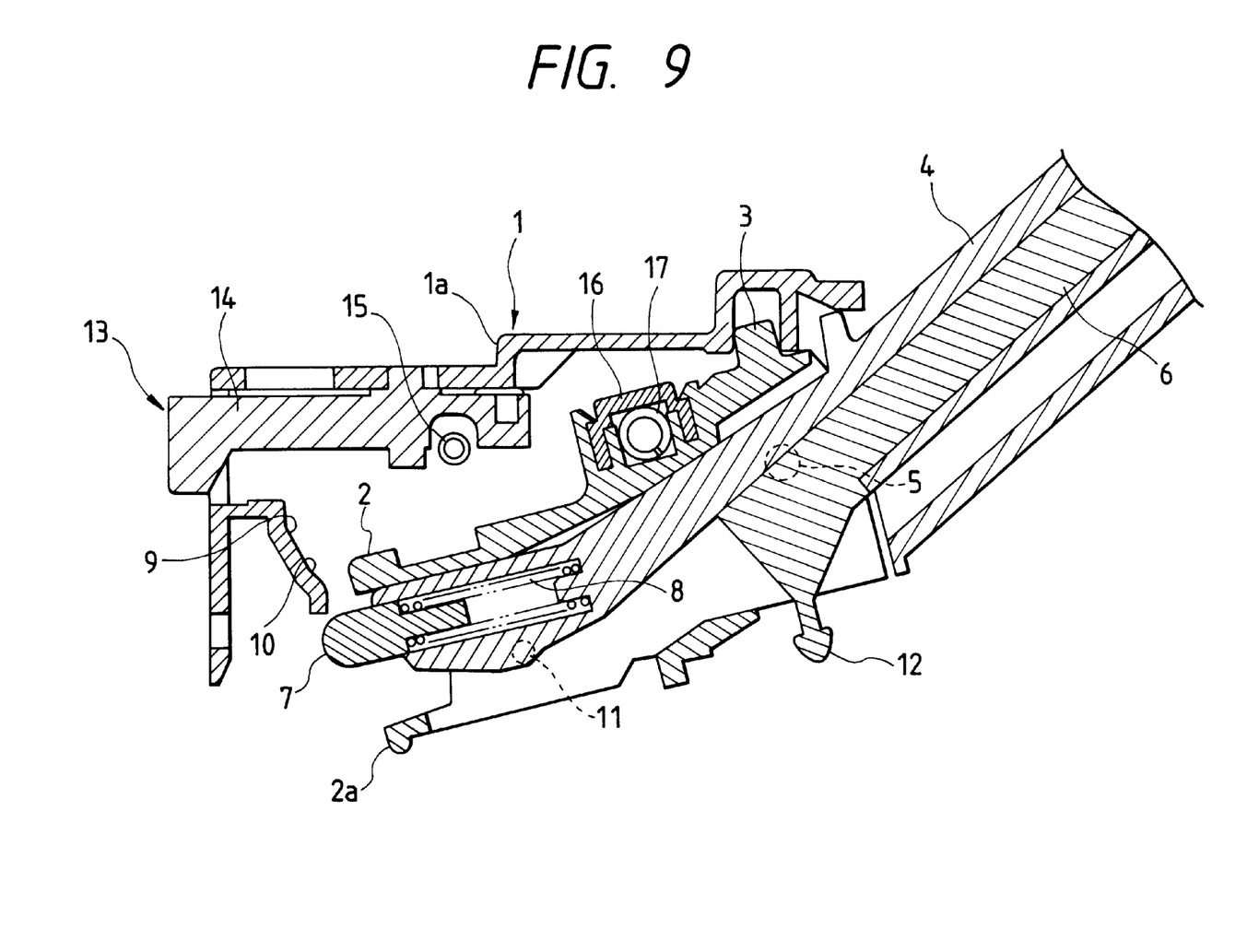
FIG. 9 is a sectional view of the same in a state where a bracket is disengaged during assembling.

At a previous step before the second unit case 1b is mounted, the bracket 2 is not prevented from separating from the first unit case 1a toward the second unit case 1b (remotely from the first unit case 1a) as shown in FIG. 8. Accordingly, the bracket 2 is likely to be disengaged from the first unit case 1a as shown in FIG. 9. Thus, it has been a problem that the assembling of the second unit case 1b cannot be conducted easily, because this must be done with careful attention to the unstable engagement of the bracket 2 with the first unit case 1a.

SUMMARY OF INVENTION

The invention has been made in view of the above circumstances, and it is an object of the invention to provide such a lever switch assembly which has both angle adjusting mechanisms for imparting angular adjustments to rotations of an operating lever in a first and second directions integrally formed that the overall thickness can be decreased and assembling of the second unit case can be easily performed.

In order to achieve the above described objects, the lever switch assembly according to the invention comprises a case including a first unit case and a second unit case connected to the first unit case, a bracket provided in the first unit case so as to rotate around a first pivotal shaft in a first direction which is perpendicular to a direction wherein the both unit cases are connected, an operating lever provided in the bracket so as to rotate around a second pivotal axis in a second direction which is a direction wherein both the unit cases are connected, the operating lever being also rotatable in the first direction together with the bracket, a first switch adapted to respond to the rotation of the operating lever in the first direction, and a second switch adapted to respond to the rotation of the operating lever in the second direction, an angle adjusting piece provided at one end of the operating lever located in the first unit case, a first angle adjusting face provided in the first unit case correspondingly to the angle adjusting piece so as to contact the angle adjusting piece to impart an angular adjustment to the rotation of the operating lever in the first direction when the operating lever is rotated in the first direction, and a second angle adjusting face adapted to contact the angle adjusting piece to impart an angular adjustment to the rotation of the operating lever in the second direction when the operating lever is rotated in the second direction, and a sliding portion provided on the bracket at an area located inside the first unit case and adapted to slide along a face in the first unit case which is directed in opposite to the second unit case along with the rotation of the bracket in the first direction.

With such an arrangement, the sliding portion provided on the bracket positioned at an area located inside the first unit case slides along the face in the first unit case which is directed in opposite to the second unit case along with the rotation of the bracket in the first direction. Thus, the projection 2a formed at the tip end of the conventional bracket 2 located in the first unit case 1a has become unnecessary and the overall thickness can be decreased.

Moreover, because the sliding portion is blocked by the face in the first unit case which is directed in opposite to the second unit case, the bracket will be prevented from disengagement at the stage before the second unit case is assembled.

BRIEF DESCRIPTION OF PREFERRED EMBODIMENTS

DETAILED DESCTIPTION OF PREFERRED EMBODIMENTS

Now, one embodiment of the invention applied to a lever switch assembly for a vehicle, especially an automobile will be described referring to FIGS. 1 to 5.

Figure 1:
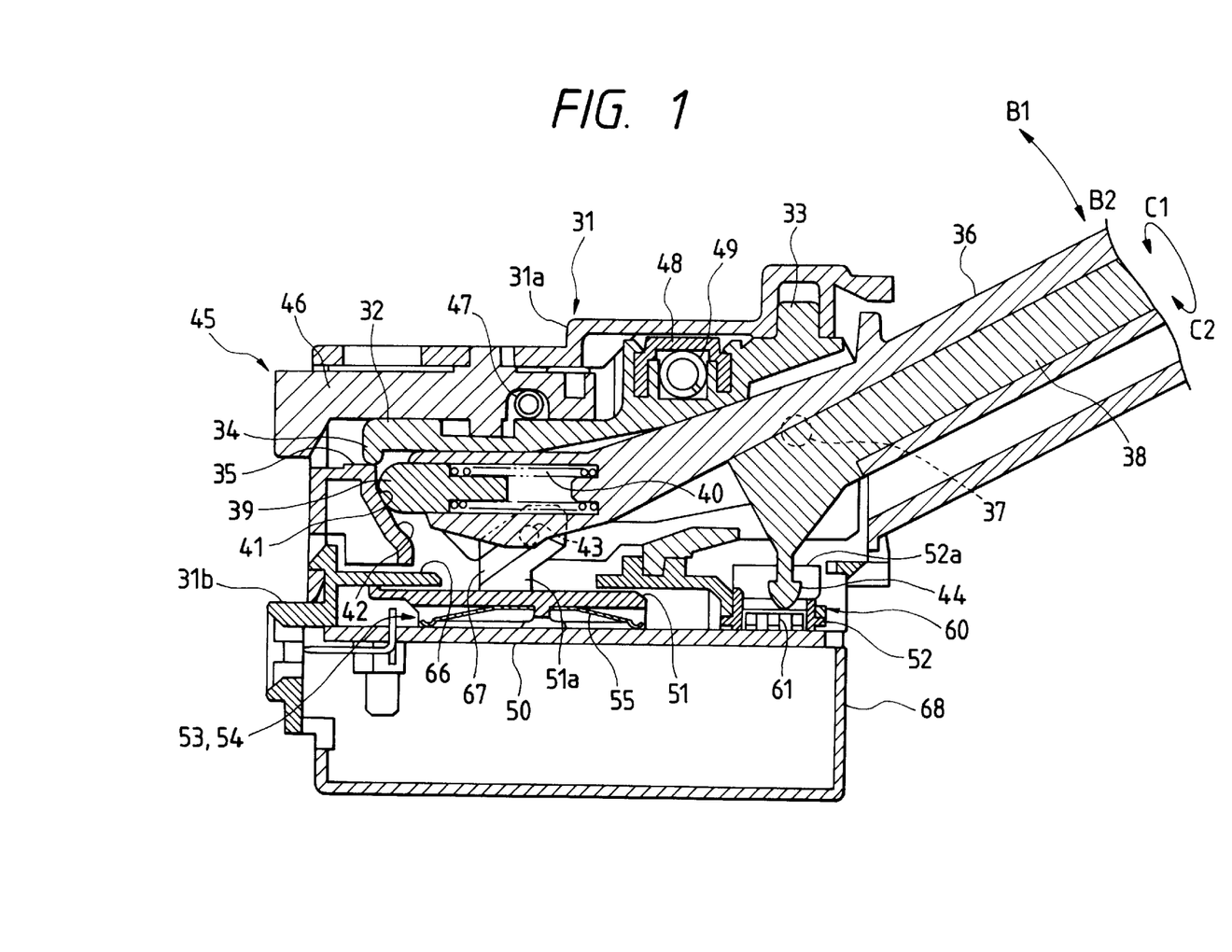
FIG. 1 is a sectional view of one embodiment of the present invention.
Figure 2:
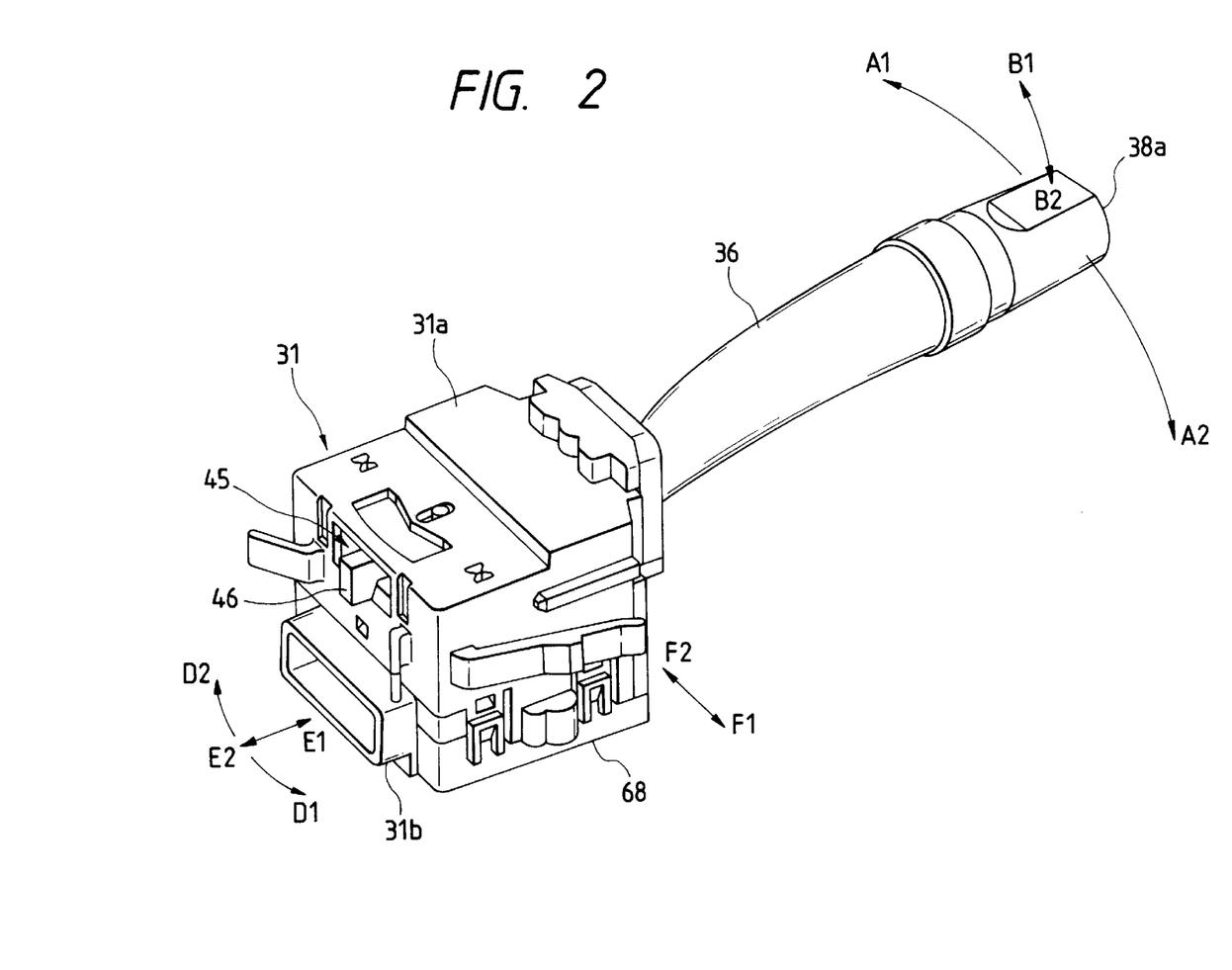
FIG. 2 is a perspective view showing an outer appearance of the same.
Figure 3:
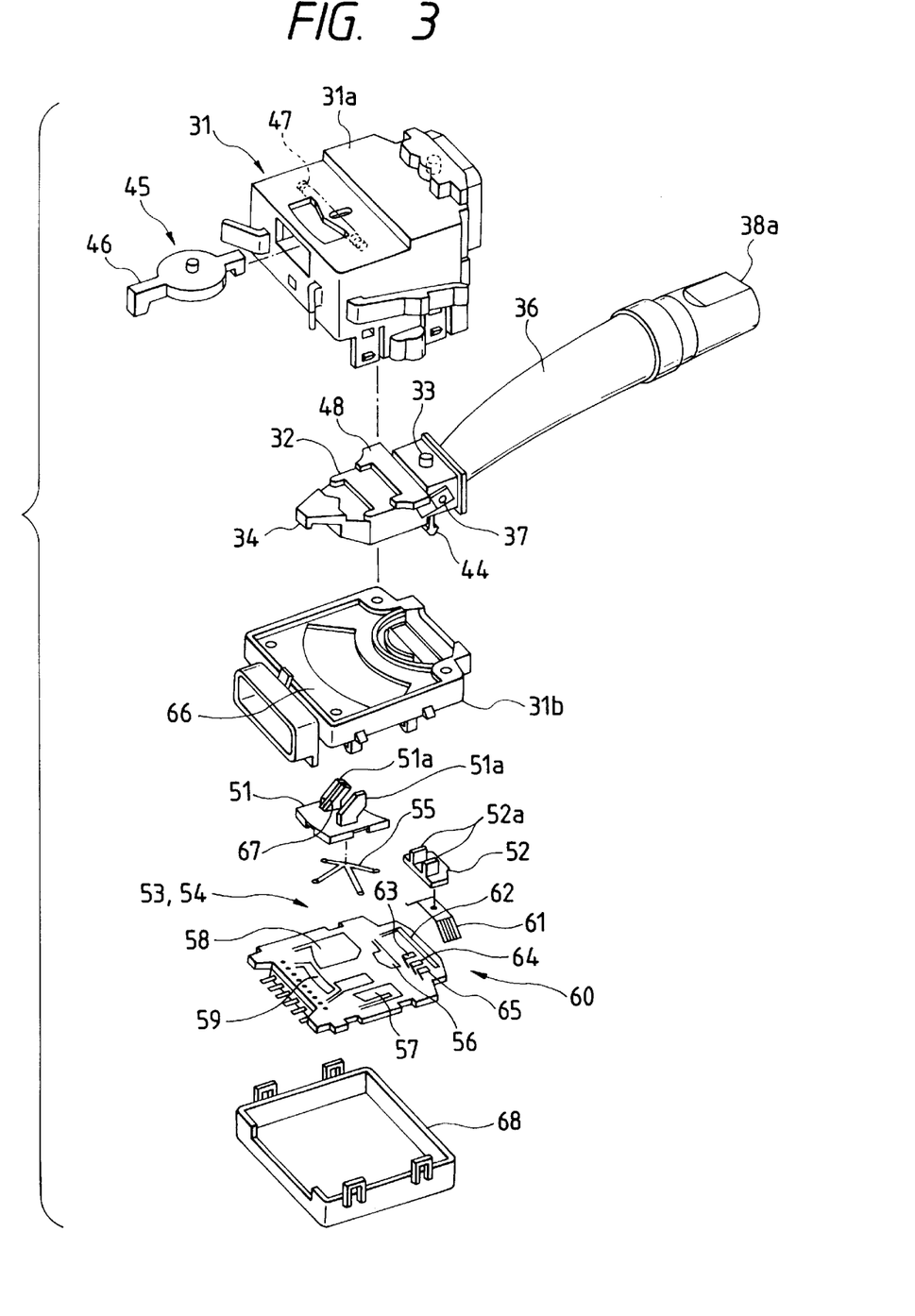
FIG. 3 is an exploded perspective view of the same.

In FIGS. 1 to 3 is shown a case 31. The case 31 includes a first unit case 31a positioned in the upper part of the drawings and a second unit case 31b positioned in the lower part of the drawings and connected to the first unit case 31a. The first unit case 31a is provided with a bracket 32 so as to rotate around a first pivotal shaft 33 in a first direction perpendicular to a vertical direction in the drawings where the unit cases 31a and 31b are fastened together (in a direction as shown by arrows A1, A2 in FIG. 2).

At an end portion of the bracket 32 located inside the first unit case 31a is formed a sliding portion 34 which projects toward the second unit case 31b. This sliding portion 34 is slidably abutted to a face 35 which is provided in the first unit case 31a and directed facing away from (upward in the drawings) the second unit case 31b.

The bracket 32 is provided with a hollow operating lever 36 so as to rotate around a second pivotal shaft 37 in a second direction where the unit cases 31a, 31b are fastened (in a direction as shown by arrows B1, B2 respectively in FIGS. 1 and 2). This operating lever 36 is so adapted as to rotate also in a direction as shown by the arrows A1, A2 together with the bracket 32.

An operating shaft 38 is inserted into the operating lever 36 rotatably around its own axis (in a direction as shown by arrows C1, C2 in FIG. 1). The operating shaft 38 is so adapted as to be rotatably operated by means of an operating button 38a (Refer to FIG. 2) fitted to its tip end at an opposite side to the case 31 (remote from the case 31).

Figure 4:
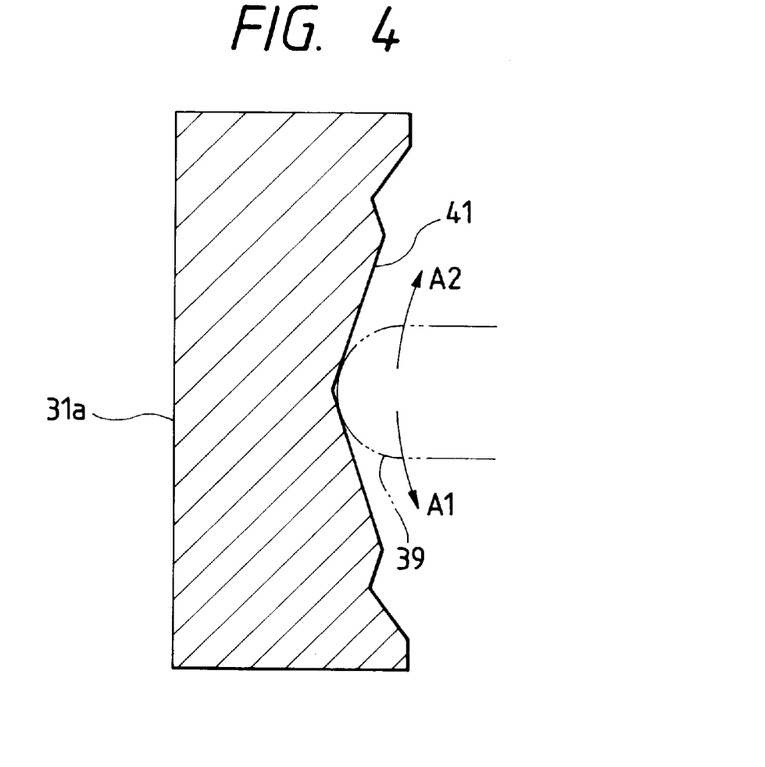
FIG. 4 is an enlarged sectional view showing independently a first angle adjusting face in a direction of arrows A1, A2.

At one end of the operating lever 36 located inside the first unit case 31a is provided an angle adjusting piece 39 which is outwardly forced by a spring 40. A first angle adjusting face 41 and a second angle adjusting face 42 are formed inside the first unit case 31a, at an area extending from the face 35 (which is directed facing away from the second unit case 31b as described above) toward the second unit case 31b, so as to mate with the angle adjusting piece 39. The first angle adjusting face 41 is so adapted as to contact the angle adjusting piece 39 when the operating lever 36 is rotated in the direction of the arrows A1, A2 to give an angular adjustment to the rotation of the operating lever 36 in the direction of the arrows A1, A2, and is corrugated having concaves and convexes in the direction of the arrows A1, A2 (in a direction perpendicular to a paper face in FIG. 1) as shown in FIG. 4.

Figure 5:
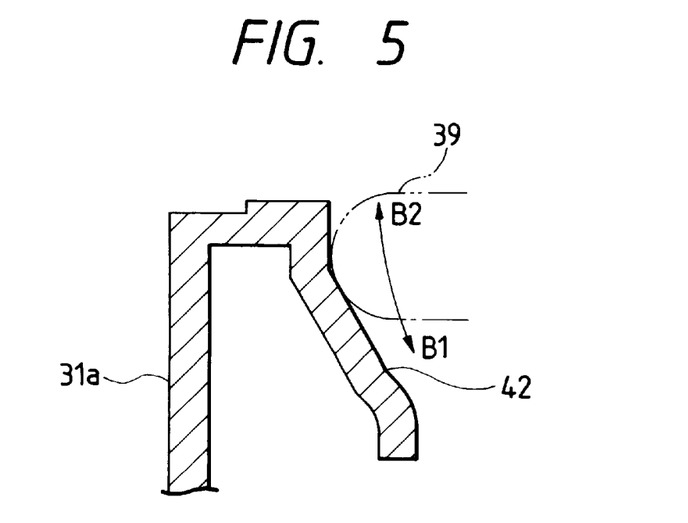
FIG. 5 is an enlarged sectional view showing independently a second angle adjusting face in a direction of arrows B1, B2.

The second adjusting face 42 is so adapted as to contact the angle adjusting piece 39 when the operating lever 36 is rotated in the direction of the arrows B1, B2 to give an angular adjustment to the rotation of the operating lever 36 in the direction of the arrows B1, B2, and is corrugated having concaves and convexes in the direction of the arrows B1, B2 (in a vertical direction in FIG. 1) as shown in FIG. 5.

The operating lever 36 is further provided with rocking projections 43 which project from both sides at its one end located inside the first unit case 31a. The operating shaft 38 is provided with a rocking projection 44 which projects downwardly at its one end located inside the first unit case 31a.

On an upper face of the bracket 32 in FIG. 1 are arranged various components which compose a lever cancelling mechanism 45. This lever cancelling mechanism 45 is so adapted as to restore the operating lever 36 which has been rotated in the direction of the arrows A1, A2 and held by the first angle adjusting face 41, by means of a rotary restoring operation of a steering wheel which is not shown. The lever canceling mechanism 45 includes the various components, such as a ratchet 46, a spring 47 for urging the ratchet 46 toward the steering wheel, a back plate 48 with which the ratchet 46 engages at the restoration, a spring 49 for resiliently holding the back plate 48, etc.

On the other hand, the second unit case 31b is provided with a wiring board 50 at its back face. Between the wiring board 50 and the second unit case 31b are provided a first contact holder 51 and a second contact holder 52 in a slidable manner. The first contact holder 51 is movable in the same direction (in a direction as shown by arrows D1, D2 in FIG. 2) as the rotation direction of the arrows A1, A2 of the operating lever 36 and also movable in a direction perpendicular (in a direction as shown by arrows E1, E2 in FIG. 2) to the direction of the arrows A1, A2. The second contact holder 52 is movable in a direction perpendicular (in a direction as shown by arrows F1, F2 in FIG. 2) to the moving direction of the arrows E1, E2 of the first contact holder 51.

Moreover, the first contact holder 51 and the wiring board 50 constitute a first switch 53 and a second switch 54 therebetween. On the back face of the first contact holder 51 is attached a movable contact 55 in a shape of a cross having four leg-like pieces as shown in FIG. 3, which is common for both the first and second switches 53, 54.

On the wiring board 50 are provided a fixed contact 56 which is common for the first and second switches 53, 54, fixed contacts 57, 58 for the first switch 53 which the movable contact 55 is engaged with and disengaged from along with the movement of the first contact holder 51 in the direction of the arrows D1, D2, and a fixed contact 59 for the second switch 54 which the movable contact 55 is engaged with and disengaged from along with the movement of the first contact holder 51 in the direction of the arrows E1, E2.

Therefore, in this case, the first contact holder 51, the movable contact 55 and the fixed contacts 56, 57, 58 constitute the first switch 53, while the first contact holder 51, the movable contact 55 and the fixed contacts 56, 59 constitute the second switch 54.

The second contact holder 52 and the wiring board 50 constitute a third switch 60 therebetween. On the back face of the first contact holder 51 is attached a movable contact 61 having three leg-like pieces for the third switch 60. On the wiring board 50 are provided a fixed common contact 62, and fixed contacts 63, 64, 65 for the third switch 60 which cause the movable contact 61 to be engaged with and disengaged from the fixed contact 56 along with the movement of the second contact holder 52 in the direction of the arrows F1, F2.

Therefore, the third switch 60 is composed of the second contact holder 52, the movable contact 61 and the fixed contacts 62 through 65.

In a state thus assembled, the second unit case 31b is fastened to the first unit case 31a. On this occasion, a face 66 (an upper face in FIG. 1) of the second unit case 31b adjacent to the first unit case 31a is made close to an end portion of the second angle adjusting face 42 of the first unit case 31a.

The first contact holder 51 has a pair of arm portions 51a which project out of the second unit case 31b (into the first unit case 31a). Between both the arm portions 51a is positioned the end of the operating lever 36 located inside the first unit case 31a, while the rocking projections 43 are slidably inserted into diagonal grooves 67 which are formed at respective inner faces of the arm portions 51a.

The second contact holder 52 also has a pair of arm portions 52a which project out of the second unit case 31b (into the first unit case 31a). Between both the arm portions 52a is positioned a rocking projection 44 of the operating shaft 38 in a slidable manner. The back face of the wiring board 50 is protected with a cover 68.

With the above described arrangement, when the operating lever 36 is rotated in the direction of the arrows A1, A2, one end of the operating lever 36 located inside the first unit case 31a presses the arm portions 51a of the first contact holder 51 in the direction of the arrows D1, D2, thereby to move the first contact holder 51 in the direction of the arrows D1, D2 together with the movable contact 55. Then, the first switch 53 responds to give a turn signal, for example. On this occasion, the sliding portion 34 formed on the bracket 32 at the area located in the first unit case 31a slides along the face 35 of the first unit case 31a which is directed facing away from the second unit case. Rotary positions of the operating lever 36 rotated in the directions of the arrows A1 and A2, and the neutral position are maintained by the first angle adjusting face 41 in engagement with the angle adjusting piece 39.

When the operating lever 36 is rotated in the direction of the arrows B1, B2, the rocking projections 43 are caused to engage with the grooves 67 to press the first contact holder 51 in the direction of the arrows E1, E2 thereby to move the first contact holder 51 in the direction of the arrows E1, E2 together with the movable contact 55. Then, the second switch 54 responds to conduct a dimmer control, for example. The operating lever 36 is so constructed as to be automatically returned to the initial position when the rotary operation in the direction of the arrow B1 is released. The initial position is maintained by the second angle adjusting face 42 in engagement with the angle adjusting piece 39.

When the operating shaft 38 is rotated in the direction of the arrows C1, C2, the rocking projection 44 presses the arm portions 52a of the second contact holder 52 in the direction of the arrows F1, F2 thereby to move the second contact holder 52 in the direction of the arrows F1, F2 together with the movable contact 61. Then, the third switch 60 responds to conduct a light control, for example. The operating shaft 38 takes three rotary positions in the direction of the arrows C1, C2, namely an off position, a small lamp lighting position, and a head lamp lighting position. These three positions are maintained by an angle adjusting mechanism which is not shown.

In this way, in the arrangement according to the invention, both the first angle adjusting face 41 for imparting the angular adjustment to the rotation of the operating lever 36 in the direction of the arrows A1, A2 and the second angle adjusting face 42 for imparting the angular adjustment to the rotation of the operating lever 36 in the direction of the arrows B1, B2 are provided together in the first unit case 31a. In short, both the angle adjusting faces 41, 42 for imparting the angular adjustments to the rotation of the operating lever 36 respectively in the directions of the arrows A1, A2 and the arrows B1, B2 with which the angle adjusting piece 39 commonly engages are integrally formed.

Therefore, it is advantageous with this arrangement that the umber of the components to be used can be decreased and the number of the assembling steps can be also reduced.

However, because the second angle adjusting face 42 is located closer to the second unit case 31b than the first angle adjusting face 41, an overall thickness in this direction tends to be larger. In addition, the various components of the lever cancelling mechanism 45 are arranged on the bracket 32 at the side remote from the second unit case 31b, which makes the total thickness much larger.

However, different from the conventional structure, when the bracket 32 rotates in the direction of the arrows A1, A2, the sliding portion 34 formed on the bracket 32 at the area located in the first unit case 31a slides along the face 35 of the first unit case 31a which is directed facing away from the second unit case. Thus, the projection 2a formed at the tip end of the conventional bracket 2 located in the first unit case 1a has become unnecessary and the overall thickness can be decreased.

In assembling too, because the sliding portion 34 is blocked by the face 35 in the first unit case 31a which is directed facing away from the second unit case, the bracket 32 is prevented from being disengaged at the stage before the second unit case 31b is mounted. Therefore, such a difficulty as assembling the second unit case 31b while paying attention to the disengagement of the bracket 32 will be eliminated. Thus, the second unit case 31b can be easily mounted.

It is to be noted that the invention is not limited to the embodiment which has been described above and illustrated in the drawings. For example, the lever switch assembly according to the invention may be applied not only to the above described turn signal operation, dimmer control and light control, but also to wiper control, washer operation, rear wiper control, etc. Besides it may be applicable to other uses than for automobiles and vehicles.

As apparent from the foregoing description, according to the lever switch assembly of the invention in which both the angle adjusting mechanisms for imparting the angular adjustments to the rotations of the operating lever in the first and second directions respectively are integrally formed, the overall thickness can be decreased and at the same time the second unit case can be easily mounted.

What is claimed is:

1. A lever switch assembly comprising:

a case including a first unit case and a second unit case connected to said first unit case;

a bracket provided in said first unit case so as to rotate around a first pivotal shaft in a first direction which is perpendicular to a direction wherein said both unit cases are connected;

an operating lever provided in said bracket so as to rotate around a second pivotal axis in a second direction which is a direction wherein both said unit cases are connected, said operating lever being rotatable in said first direction together with said bracket;

a first switch adapted to respond to the rotation of said operating lever in the first direction, and a second switch adapted to respond to the rotation of said operating lever in the second direction;

an angle adjusting piece provided at one end of said operating lever located in said first unit case;

a first angle adjusting face provided in said first unit case correspondingly to said angle adjusting piece so as to contact said angle adjusting piece to impart an angular adjustment to the rotation of said operating lever in the first direction when said operating lever is rotated in the first direction;

a second angle adjusting face adapted to contact said angle adjusting piece to impart an angular adjustment to the rotation of said operating lever in the second direction when said operating lever is rotated in the second direction; and a sliding portion provided on said bracket an area located inside said first unit case and adapted to slide along a sliding face in said first unit case which is directed facing away from said second unit case along with said rotation of the bracket in the first direction, said sliding face being located adjacent said first and second angle adjusting faces.

2. A lever switch assembly as claimed in claim 1, wherein said first angle adjusting face and said second angle adjusting face defines a beak shape.

\* \* \* \* \*